United States Patent [19]
Morman

[11] Patent Number: 5,910,224
[45] Date of Patent: Jun. 8, 1999

[54] METHOD FOR FORMING AN ELASTIC NECKED-BONDED MATERIAL

[75] Inventor: Michael Tod Morman, Alpharetta, Ga.

[73] Assignee: Kimberly-Clark Worldwide, Inc., Neenah, Wis.

[21] Appl. No.: 08/927,288

[22] Filed: Sep. 11, 1997

Related U.S. Application Data

[60] Provisional application No. 60/028,353, Oct. 11, 1996.

[51] Int. Cl.$^6$ .................................................... B32B 5/00
[52] U.S. Cl. ......................... 156/178; 156/229; 442/328
[58] Field of Search ............................ 156/62.4, 62.8, 156/160, 161, 163, 164, 176, 178, 180, 181, 229; 442/328

[56] References Cited

U.S. PATENT DOCUMENTS

| | | | |
|---|---|---|---|
| 2,031,703 | 2/1936 | Galligan et al. | 154/55 |
| 3,093,502 | 6/1963 | Drelich | 117/38 |
| 3,214,323 | 10/1965 | Russell et al. | 161/148 |
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,542,615 | 11/1970 | Dobo et al. | 156/181 |
| 3,615,976 | 10/1971 | Endres et al. | 156/83 |
| 3,687,754 | 8/1972 | Stumpf | 156/72 |
| 3,692,618 | 9/1972 | Dorschner et al. | 161/72 |
| 3,775,236 | 11/1973 | Ambrose | 161/116 |
| 3,802,817 | 4/1974 | Matsuki et al. | 425/66 |
| 3,808,088 | 4/1974 | Knechtges et al. | 161/148 |
| 3,816,228 | 6/1974 | Stumpf | 161/63 |
| 3,849,241 | 11/1974 | Butin et al. | 161/169 |
| 3,855,046 | 12/1974 | Hansen et al. | 161/150 |
| 3,870,592 | 3/1975 | Brock et al. | 161/148 |
| 3,879,257 | 4/1975 | Gentile et al. | 162/112 |
| 3,900,632 | 8/1975 | Robinson | 428/196 |
| 3,903,342 | 9/1975 | Roberts, Jr. | 428/153 |
| 3,908,058 | 9/1975 | Russell et al. | 428/198 |
| 3,937,859 | 2/1976 | Carra et al. | 428/194 |
| 4,041,203 | 8/1977 | Brock et al. | 428/157 |
| 4,086,112 | 4/1978 | Porter | 156/73.1 |
| 4,308,184 | 12/1981 | Thoma et al. | 260/29.2 |
| 4,340,563 | 7/1982 | Appel et al. | 264/518 |
| 4,366,814 | 1/1983 | Riedel | 128/156 |
| 4,374,888 | 2/1983 | Bornslaeger | 428/198 |
| 4,397,892 | 8/1983 | Lorant et al. | 427/245 |
| 4,413,391 | 11/1983 | Renjilian et al. | 28/166 |
| 4,421,812 | 12/1983 | Plant | 428/152 |
| 4,422,892 | 12/1983 | Plant | 156/209 |
| 4,443,513 | 4/1984 | Meitner et al. | 422/195 |
| 4,451,315 | 5/1984 | Miyazaki | 156/220 |
| 4,477,514 | 10/1984 | Gee et al. | 428/264 |
| 4,525,407 | 6/1985 | Ness | 428/138 |
| 4,720,415 | 1/1988 | Vander Wielen et al. | 428/152 |
| 4,789,699 | 12/1988 | Kieffer et al. | 524/271 |
| 4,801,482 | 1/1989 | Goggans et al. | 428/68 |
| 4,863,779 | 9/1989 | Daponte | 428/152 |

(List continued on next page.)

FOREIGN PATENT DOCUMENTS

| | | |
|---|---|---|
| 866739 | 3/1971 | Canada . |
| 472942A1 | 3/1992 | European Pat. Off. . |
| 0707106 | 4/1996 | European Pat. Off. . |
| 1059059 | 3/1954 | France . |
| 53-86874 | 7/1978 | Japan . |
| 984047 | 2/1965 | United Kingdom . |
| 1200235 | 1/1968 | United Kingdom . |
| 92/16371 | 10/1992 | WIPO . |
| 9517302 | 6/1995 | WIPO . |
| 9616216 | 5/1996 | WIPO . |

*Primary Examiner*—James Sells
*Attorney, Agent, or Firm*—Douglas H. Tulley, Jr.

[57] ABSTRACT

A method of making a stretchable composite by applying an elastomeric precursor to a neckable material, neck-stretching the neckable material and heating the elastomeric precursor such as by heating, while the neckable material is in a necked condition. The elastomeric precursor can comprise a latex or thermoset elastomer which is applied to the fibrous neckable material in an amount between 5 g/m$^2$ to about 50 g/m$^2$.

20 Claims, 6 Drawing Sheets

U.S. PATENT DOCUMENTS

| | | | |
|---|---|---|---|
| 4,908,247 | 3/1990 | Baird et al. | 428/34.9 |
| 4,935,287 | 6/1990 | Johnson et al. | 428/198 |
| 4,965,122 | 10/1990 | Morman | 428/225 |
| 4,981,747 | 1/1991 | Morman | 428/198 |
| 4,984,584 | 1/1991 | Hansen et al. | 128/898 |
| 4,990,392 | 2/1991 | Groshens et al. | 428/196 |
| 5,114,781 | 5/1992 | Morman | 428/198 |
| 5,116,662 | 5/1992 | Morman | 428/198 |
| 5,124,195 | 6/1992 | Harpell et al. | 428/245 |
| 5,145,727 | 9/1992 | Potts et al. | 428/198 |
| 5,169,706 | 12/1992 | Collier, IV et al. | 428/152 |
| 5,178,931 | 1/1993 | Perkins et al. | 428/198 |
| 5,188,885 | 2/1993 | Timmons et al. | 428/198 |
| 5,226,992 | 7/1993 | Morman | 156/62.4 |
| 5,230,701 | 7/1993 | Meyer et al. | 602/76 |
| 5,244,482 | 9/1993 | Hassenboehler, Jr. et al. | 55/528 |
| 5,286,553 | 2/1994 | Haraguchi et al. | 428/233 |
| 5,332,613 | 7/1994 | Taylor et al. | 428/152 |
| 5,334,446 | 8/1994 | Quantrille et al. | 428/284 |
| 5,336,545 | 8/1994 | Morman | 428/152 |
| 5,344,691 | 9/1994 | Hanschen et al. | 428/152 |
| 5,376,430 | 12/1994 | Swenson et al. | 428/152 |
| 5,393,599 | 2/1995 | Quantrille et al. | 428/284 |
| 5,405,650 | 4/1995 | Boulanger et al. | 427/261 |
| 5,441,056 | 8/1995 | Weber et al. | 128/849 |
| 5,503,908 | 4/1996 | Faass | 428/198 |
| 5,514,470 | 5/1996 | Haffner et al. | 428/246 |

METHOD FOR FORMING AN ELASTIC NECKED-BONDED MATERIAL

This application claims benefit of prior filed Provisional Application No. 60/028,353 filed Oct. 11, 1996.

FIELD OF THE INVENTION

The present invention relates to methods of forming elasticized materials. More particularly, the present invention relates to composite elastic neck-bonded materials and methods of making the same.

BACKGROUND

Polymeric nonwoven webs formed by nonwoven extrusion processes such as, for example, meltblowing processes and spunbonding processes may be manufactured into products and components of products so inexpensively that the products could be viewed as disposable after only one or a few uses. Examples of such products include diapers, tissues, wipes, garments, mattress pads and feminine care products. There exists a continuing need for improved materials which are elastic, resilient, and flexible while still having a pleasing feel. A problem in fulfilling this need is that commercially viable elastic materials often feel rubbery.

The unpleasant tactile properties of elastic materials may be avoided by forming a laminate comprising an elastic sheet with one or more nonelastic sheets which have a soft feel. However, nonwoven webs formed from nonelastic polymers having improved tactile properties such as, for example, polypropylene are generally considered nonelastic. The lack of elasticity usually restricts these nonwoven fabrics to applications where elasticity is not required. Nevertheless, laminates of elastic and nonelastic materials have been made by bonding the nonelastic material to the elastic material in a manner that allows the laminate to stretch and recover yet which retains the desirable tactile properties of the nonelastic material. Elastic laminates, comprising an elastic sheet and a soft nonelastic material, are typically incorporated into products such that the soft material will contact a person's skin or forms the outermost portion of the product.

In one such laminate, a nonelastic material is joined to an elastic material while the elastic material is in a stretched condition so that when the elastic material is relaxed, the nonelastic material gathers between the locations where it is bonded to the elastic material. The resulting composite elastic material is readily stretchable to the extent that the nonelastic material gathered between the bond locations allows the elastic material to elongate. An example of this type of composite material is disclosed, for example, by U.S. Pat. No. 4,720,415 to Vander Wielen et al.

Another elastic laminate known in the art includes those conventionally referred to as "neck-bonded" materials. Necked-bonded materials are generally fabricated by bonding an elastic member to a non-elastic member while the non-elastic member is narrowed or necked. Neck-bonded laminates provide a material which is stretchable in the necked direction, the necked direction is most commonly also the cross-machine direction. Examples of neck-bonded laminates are described in commonly assigned U.S. Pat. Nos. 5,226,992 and 5,336,545 both to Morman. In addition, "reversibly necked materials" include materials which are stretchable to about the pre-necked dimensions and which, upon release of the stretching force, substantially recover to the necked dimensions unaided by additional materials. Such materials are typically formed by necking the material and treating the necked material, such as by heating and cooling the material, in order to impart memory of the necked dimensions to the material. Reversibly necked materials and methods of forming the same are disclosed in commonly assigned U.S. Pat. No. 4,965,122 to Morman.

Due to the methods of making elastic laminates, such as those described above, there exists a variety of elastic materials having the requisite characteristics for use in forming the elastic laminate structure. Similarly, there likewise exists a variety of neckable materials which are suitable for use in forming the elastic laminate structure. However, due to the variety of elastic and neckable materials potentially used to form elastic laminates there exist certain combinations of elastic and neckable materials which, although having excellent physical characteristics, do not adhere well to the other layers of the laminate. Thus, there exists a need for necked bonded laminates, and methods of producing the same, having improved integrity as well as the desired tactile and elastic properties.

DEFINITIONS

As used herein the term "spunbonded fibers" refers to small diameter fibers which are formed by extruding molten thermoplastic material as filaments from a plurality of fine, usually circular capillaries of a spinneret with the diameter of the extruded molten filaments then being rapidly reduced as described in, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. No. 3,338,992 and 3,341,394 to Kinney, U.S. Pat. No. 3,502,763 to Hartman, U.S. Pat. No. 3,542,615 to Dobo et al; and U.S. Pat. No. 5,382,400 to Pike et al. Spunbond fibers are then usually cooled and solidified so they are not tacky when they are deposited onto a collecting surface. Spunbond fibers are generally continuous and have average diameters (from a sample of at least 10) larger than 7 microns, more particularly, between about 10 and 40 microns.

As used herein the term "meltblown fibers" refers to fibers formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfiber diameter. Thereafter, the meltblown fibers are cooled and carried by the high velocity gas stream and are deposited on a collecting surface to form a web of randomly disbursed meltblown fibers. Such a process is disclosed, for example, in U.S. Pat. No. 3,849, 241 to Butin et al.

As used herein "multilayer laminate" refers to a laminate wherein some of the layers are spunbond and some meltblown such as a spunbond/meltblown/spunbond (SMS) laminate and others as disclosed in U.S. Pat. No. 4,041,203 to Brock et al., U.S. Pat. No. 5,169,706 to Collier, et al, U.S. Pat. No. 5,145,727 to Potts et al., U.S. Pat. No. 5,178,931 to Perkins et al. and U.S. Pat. No. 5,188,885 to Timmons et al. Such a laminate may be made by sequentially depositing onto a moving forming belt first a spunbond fiber layer, then a meltblown fiber layer and last another spunbond fiber layer and then bonding to form a laminate. Alternatively, the fabric layers may be made individually, collected in rolls, and combined in a separate bonding step. Such fabrics usually have a basis weight of from about 0.1 to about 12 ounces per square yard (about 3.4 to about 400 g/m²), or more particularly from about 0.75 to about 3 ounces per square yard (about 25 to about 101 g/m²). Multilayer laminates may also have various numbers of meltblown layers or multiple spunbond layers in many different configurations and may include other materials like woven layers, films or coform materials.

As used herein, the term "machine direction" or MD refers to the direction in which the neckable material is produced. The term "cross machine direction" or CD refers to the direction generally perpendicular to the MD.

As used herein the term "microfibers" refers to small diameter fibers having an average diameter not greater than about 100 microns, for example, having an average diameter of from about 0.5 microns to about 50 microns, or more particularly, microfibers desirably have an average diameter of from about 2 microns to about 40 microns.

As used herein, "ultrasonic bonding" refers to a process performed, for example, by passing the fabric between a sonic horn and anvil roll as illustrated in U.S. Pat. No. 4,374,888 to Bornslaeger.

As used herein "thermal point bonding" involves passing a fabric or web of fibers to be bonded between a heated bonding assembly, such as a heated calender roll and a heated anvil roll. The calender roll is usually, though not always, patterned in some way so that the entire fabric is not bonded across its entire surface, and the anvil roll is usually smooth. As a result, various patterns for calender rolls have been developed for functional as well as aesthetic reasons. One example of a pattern is the Hansen Pennings or "HP" pattern with about a 30% bond area with about 200 bonds/square inch as taught in U.S. Pat. No. 3,855,046 to Hansen and Pennings. A new HP pattern roll has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen Pennings or "EHP" bond pattern which, when new, produces a 15% bond area with a square pin having a side dimension of 0.037 inches (0.94 mm), a pin spacing of 0.097 inches (2.464 mm) and a depth of 0.039 inches (0.991 mm). Another typical point bonding pattern designated "714" has square pin bonding areas wherein each pin has a side dimension of 0.023 inches, a spacing of 0.062 inches (1.575 mm) between pins, and a depth of bonding of 0.033 inches (0.838 mm) when new. The resulting pattern has a bonded area of about 15%. Yet another common pattern is the C-Star pattern which has a bond area of about 16.9% when new. The C-Star pattern has a cross-directional bar or "corduroy" design interrupted by shooting stars. Other common patterns include a diamond pattern with repeating and slightly offset diamonds with about a 16% bond area and a wire weave pattern looking similar to a window screen, with about a 19% bond area. Typically, the percent bonding area varies from around 10% to around 30% of the area of the fabric laminate web.

The term "elastic" as used herein refers to any material which, upon application of a biasing force, is elongatable to a stretched, biased length which is at least about 160 percent of its relaxed unbiased length, and which, will recover at least 55 percent of its elongation upon release of the elongating force. A hypothetical example would be a one (1) inch sample of a material which is elongatable to at least 1.60 inches and which, upon being elongated to 1.60 inches and released, will recover to a length of not more than 1.27 inches. Many elastic materials may be stretched by much more than 60 percent of their relaxed length, for example, 100 percent or more, and many of these will recover to substantially their original relaxed length, for example, to within 105 percent of their original relaxed length, upon release of the stretching force.

As used herein, the term "nonelastic" refers to any material which does not fall within the definition of "elastic," above.

As used herein, the term "recover" refers to a retraction of a stretched material upon termination of a biasing force following stretching of the material by application of the biasing force. For example, if a material having a relaxed, unbiased length of one (1) inch is elongated 60 percent by stretching to a length of 1.6 inches the material would be elongated 60 percent (0.6 inch) and would have a stretched length that is 160 percent of its relaxed length. If this exemplary stretched material contracted, that is recovered to a length of one and two tenths (1.2) inches after release of the biasing and stretching force, the material would have recovered about 66 percent (0.4 inch) of its 0.6 inch elongation. Recovery may be expressed as [(maximum stretch length–final sample length)/(maximum stretch length–initial sample length)]×100.

As used herein, the terms "necking" or "neck stretching" interchangeably refer to a method of elongating a nonwoven fabric, e.g. in the machine direction, to reduce its width in the direction perpendicular to that of elongation in a controlled manner to a desired amount. The controlled stretching and necking may take place under cool, room temperature or higher temperatures and is limited to an increase in overall dimension in the direction being stretched up to the elongation required to break the fabric. When relaxed, the web relaxes toward its original dimensions. Such a process is disclosed, for example, in U.S. Pat. No. 4,443,513 to Meitner and Notheis, U.S. Pat. Nos. 4,965,122, 4,981,747 and 5,114,781 to Morman and U.S. Pat. No. 5,244,482 to Hassenboehler Jr. et al.

As used herein, the term "neckable material" refers to any material which can be necked; that is a material that can be constricted in at least one dimension by processes such as, for example, drawing.

As used herein, the term "necked material" refers to any material which has been constricted in at least one dimension by processes such as, for example, drawing.

As used herein the term "reversibly necked material" refers to a material which is capable of being stretched in the necked direction to its original pre-necked dimensions and, upon removal of the stretching force, substantially returning to the necked dimensions unaided, such as by an elastomeric sheet. Typically, reversibly necked materials include necked materials which have been heated and cooled while under a tensioning force. The heating and cooling of the material while necked serves to impart memory of the material's necked condition.

As used herein, the term "percent neckdown" refers to the ratio determined by measuring the difference between the un-necked dimension and the necked dimension of the neckable material and then dividing that difference by the un-necked dimension of the neckable material. The ratio is then multiplied by 100.

As used herein, the term "sheet" means either a film, foam or a nonwoven web.

As used herein, the term "elastomeric precursor" refers to a material that is not elastic as applied but may be treated to produce an elastic layer by undergoing polymerization, curing, cross-linking, coalescing, drying or evaporation of a solvent. However, the term "elastomeric precursor" does not exclude materials containing elastomers. For example, often a latex formulation will contain elastomers but the applied latex formulation does not form an elastic material until dried.

As used herein the term "elastic layer" means an elastic material which, when supported on a necked substrate, may be either continuous, e.g. a film, or discontinuous, e.g. a repeating or random pattern of discrete regions.

As used herein, the term "composite elastic necked-bonded material" refers to a material having an elastic layer attached to a necked material. The elastic material may be attached to the necked material at intermittent points or regions or may provide complete coverage of the necked material. The composite elastic necked-bonded material is elastic in a direction generally parallel to the direction of neckdown of the necked material. A composite elastic necked-bonded material may include more than two layers. For example, the elastic material may have a necked material joined to both of its sides so that a three-layer composite elastic necked-bonded material is formed having a structure of necked material/elastic material/necked material. Additional elastic material layers and/or necked material layers may be added. In addition, numerous other combinations of elastic material layers and necked materials may also be used.

SUMMARY OF THE INVENTION

It is an object of the present invention to provide a method of making necked-bonded laminates having improved integrity.

It is a further object of the present invention to provide a method of making necked-bonded laminates which is more efficient and which provides improved compatibility between elastic and neckable materials.

These and other objects, features and advantages are provided by the present invention which in one aspect relates to a process of forming a stretchable composite comprising the steps of: (a) applying an elastomeric precursor to a first neckable material, (b) neck-stretching said neckable material; and (c) treating said elastomeric precursor to form an elastic layer wherein said elastic layer has sufficient recovery properties and coverage to allow the neckable material to recover when stretched in the necked direction. The elastomeric precursor may be applied to the neckable material prior to or during neck-stretching of the neckable material.

A further aspect of the invention relates to a process of forming a stretchable composite comprising the steps of: (a) applying an elastomeric precursor to a first necked material; and (b) treating said elastomeric precursor to form an elastic layer wherein said elastic layer has sufficient recovery properties and coverage to allow the neckable material to recover when stretched in the necked direction.

In a further aspect of the invention, the elastomeric precursor may comprise a latex and treating of the elastomeric precursor may comprise drying the latex. In still a further aspect of the invention, the elastomeric layer may comprise a thermoset polymer which is formed by cross-linking and/or curing the elastomeric precursor such as by heating the precursor. Further, the elastomeric precursor may be applied in an amount sufficient to provide an elastic layer having a coverage of from 2 to 100 g/m$^2$. In still a further aspect of the invention, a second neckable layer may be attached to the elastic layer.

DETAILED DESCRIPTION OF THE INVENTION

Figure 1:
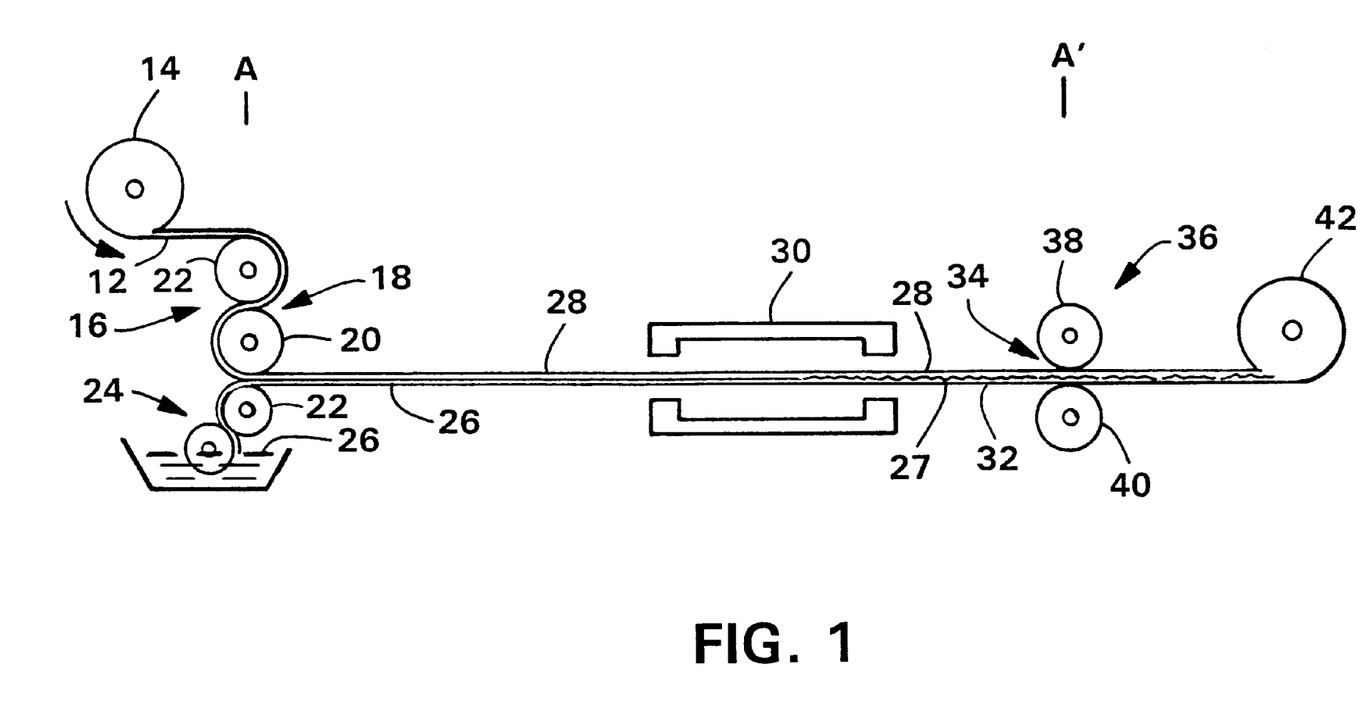
FIG. 1 is a schematic representation of an exemplary process for forming an elastic necked-bonded composite material having an elastic layer formed from an elastomeric precursor.

Referring to FIG. 1 of the drawings there is schematically illustrated a process for forming a composite elastic necked-bonded material 32. According to the present invention, a neckable material 12 is unwound from a supply roll 14 and travels in the direction indicated by the arrows associated therewith as the supply roll 14 rotates in the direction of the arrows associated therewith. Those skilled in the art will appreciate that the neckable material 12 may be formed by nonwoven extrusion processes, such as, for example, melt-blowing processes or spunbonding processes, without first being stored on a supply roll. An elastomeric precursor 26 may then be applied to the neckable material 12 prior to necking the neckable material 12. Thereafter, the elastomeric precursor 26 may be treated after necking to form a composite necked-bonded elastic material 32.

The elastomeric precursor 26 is desirably applied having a thickness of from 0.1 to 100 mils or in an amount sufficient to provide an elastic layer 27 with a coverage of from about 1 to about 100 g/m$^2$, desirably from about 2 to about 50 g/m$^2$ and even more desirably about 5 to about 20 g/m$^2$. Such low basis weight sheets are useful for economic reasons, particularly for use in disposable products. However, depending on the desired application of the elastic necked-bonded composite, elastic sheets having higher basis weights may also be advantageous. Suitable elastic materials and their corresponding elastomeric precursors are discussed herein below in greater detail. The elastomeric precursor 26 may be applied to the neckable material 12 by any of the numerous techniques known in the art for printing, coating or spraying materials on a sheet or fabric-like surface. The elastomeric precursor 26 may be applied by various methods including, but not limited to, wire-wound coating bars, calendering, extrusion, spraying, direct gravure printing, knife-over-roll coating, floating-knife coating, reverse roll coating, rotary screen coating, transfer coating and flexographic printing. Further, it will be appreciated that the elastomeric precursor may be applied in a single or successive applications.

The desired method of applying particular elastomeric precursors will vary in accord with factors well known to those skilled in the art, such as, the flow characteristics of the precursor, the desired thickness and gauge tolerance of the coating, line-speed and the surface characteristics of the material being coated. Flexographic or direct gravure printing are preferred since it allows a precise application of small quantities of precursor to be applied to the neckable material. In gravure, flexographic and screen printing equipment, the printed composition is transferred to a printing transfer surface which contains the printed patterns and then from the transfer surface the printing composition is transferred directly to the substrate. Preferably, the elastomeric precursor is applied in a pattern which at least extends substantially continuously across the fabric in the necked direction.

In the particular embodiment of FIG. 1, the neckable material 12 passes through a nip 18 of drive-roll assembly 16 formed by the rolls 20 and 22. An elastomeric precursor 26 is applied to the neckable material 12 by a coating assembly 24, such as a gravure-print coater. The individual rolls of the coating assembly 24 rotate and guide the elastomeric precursor 26 through the coating assembly 24 onto the neckable material 12. The elastomeric material 16 is removed from the coater by lightly pressing the precursor against the neckable material 12 in the final nip of coating assembly 24 created with roll 20 of drive-roll assembly 16. However, the elastomeric precursor can alternatively be applied down line from roll assembly 16, prior to treating device 30, such that the elastomeric precursor is applied while the neckable material is being neck-stretched.

Penetration of the elastomeric precursor typically occurs without the need for additional means for pressing or driving the elastomeric precursor into the neckable material. For example, although polyolefin nonwoven webs are often hydrophobic, many latex formulations include surfactants which make the latex compatible with the nonwoven material and are thus readily wicked or absorbed into the web. However, in the event further penetration is desired an additional pressure roll assembly may be provided to obtain the desired penetration. Further, either the composition of the elastomeric precursor may be varied or the neckable material can be treated to achieve the desired compatibility between the materials.

With porous neckable materials, such as a nonwoven web, the depth to which the elastomeric precursor 16 penetrates the neckable material 12 can affect the elastic properties of the necked-bonded laminate produced. Generally, the elastic properties of the resulting laminate decrease as the degree of penetration of elastomeric precursor 26 increases. Moreover, strikethrough of the precursor and the resulting elastic material can detract from the soft hand of the necked material. Thus, the nip pressure should be closely controlled until the elastomeric precursor has been treated to form an elastic layer. In most cases, a gap will be maintained between the rolls to insure that the precursor does not significantly penetrate into the neckable material. However, penetration of the elastomeric precursor near the surface is desirable where the elastic layer does not sufficiently bond to the necked material since, when treated, the resulting elastic layer will form an elastic material which is embedded in the neckable material. For example, with nonwoven materials the elastic layer will surround fibers within the web thereby providing mechanical attachment to the web. In such instances, the elastomeric precursor 26 should penetrate at least one fiber thickness and desirably penetrates from 2 to about 10 fiber thicknesses.

Penetration of the elastomeric precursor into the neckable material may be limited or controlled by various means. Printing techniques will likely cause less penetration than spray or gravure application of the precursor. In addition, the neckable material may be treated immediately after being applied to the neckable material thereby limiting the extent to which the viscous precursor penetrates into the neckable material. In addition, the neckable material may include a barrier to further stop penetration of the precursor. For example, the neckable material may comprise a multilayer laminate, e.g. an SMS, having a thin internal meltblown layer adjacent a low basis weight spunbond which limits penetration and prevents strikethrough. Nonwoven meltblown fabrics having fiber diameters less than 10 microns typically have very small pore structures which will prevent penetration of the precursor. Alternatively, larger fiber diameter nonwovens with larger pore sizes may be treated with or include a repellent, such as a fluorocarbon, which prevents penetration of the precursor into the fabric; see U.S. Pat. No. 5,441,056 issued to Weber et al., the entire contents of which are incorporated herein by reference. In this regard, a neckable material may be produced using multiple spunbond banks wherein one or more banks produce layers of spunbond fibers which are treated with or otherwise incorporate a repellent and at least the last bank forms a layer of untreated fibers over the previously laid repellent-treated fibers. The multiple layers of spunbond fibers may then be bonded to form a coherent web capable of being necked. Thus, when the precursor is applied to the neckable material it will penetrate only the repellent-free fibers located at the upper surface of the neckable material From the drive-roll assembly 16, the neckable material 12 undergoes neck-stretching, being pulled by the pressure nip 34 formed by a bonder-roll assembly 36. Because the peripheral linear speed of the rolls of the drive-roll assembly 16 is controlled to be less than the peripheral linear speed of the bonder-roll assembly 36, the neckable material 12 is tensioned between the drive-roll assembly 16 and the bonder-roll assembly 36. By adjusting the distance between and the difference in the speeds of the roll assemblies 16 and 36, the neckable material 12 is tensioned so that it necks a desired amount, forming necked material 28.

Figure 2:
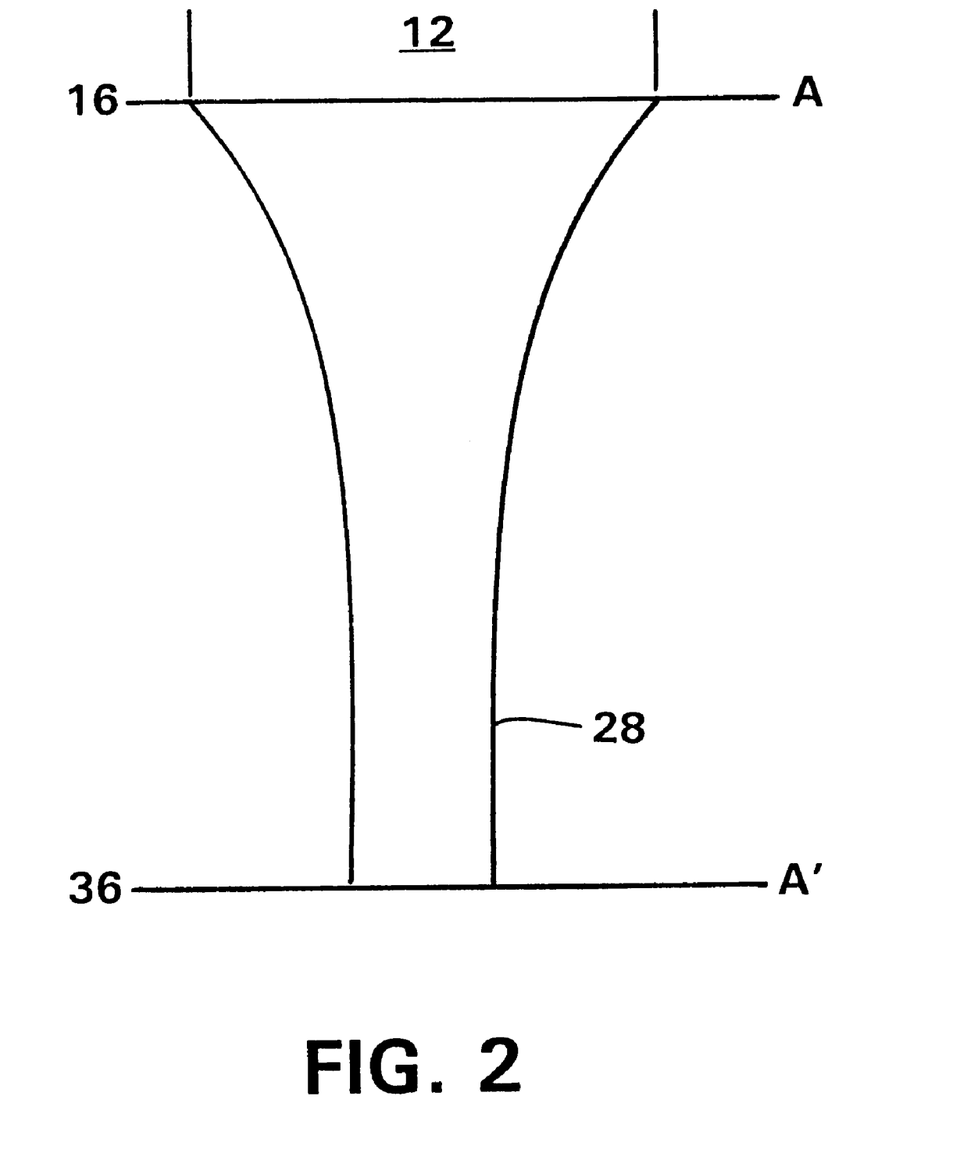
FIG. 2 is a plan view of a neckable material under a tensioning force.

The neckable material 12 desirably necks a desired amount before reaching the treating device 30 although it may neck further upon heating. In reference to FIG. 2, a neckable material 12 is necked-stretched between a first and second roll assembly 16 and 36. However, the percent neckdown increases as the neckable material travels away from the first roll assembly 16 towards the second roll assembly 36. The neckable material 12 necks until approaching equilibrium, a point at which without additional tension or heating no further necking will occur. Desirably, roll assemblies are separated a sufficient distance to substantially approach equilibrium. Further, it is also desirable that the elastomeric precursor (not shown) is treated, at a point along the distance between the first and second roll assemblies 16 and 36, such that an elastic layer is not formed until after the neckable material is necked the desired amount.

The relation between the original dimensions of the neckable material 12 to its dimensions after tensioning and necking determines the approximate limits of stretch of composite elastic necked-bonded material 32. Because the necked material 28 is able to stretch and return to its pre-necked dimensions in the cross-machine direction, the composite elastic necked-bonded material 32 will be stretchable in generally the same direction that the neckable material 12 was necked.

Figure 3:
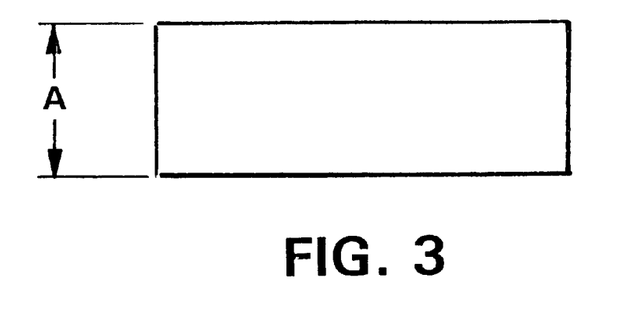
FIG. 3 is a plan view of a neckable material before tensioning and necking.
Figure 3A:
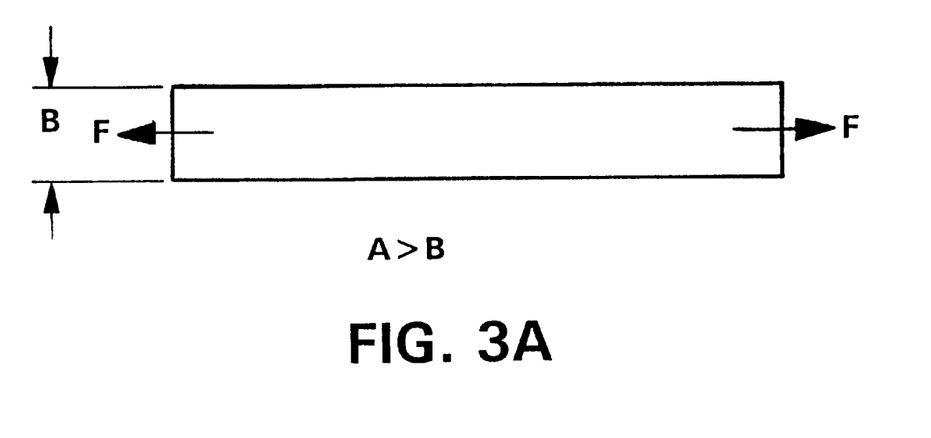
FIG. 3A is a plan view of a necked material.
Figure 3B:
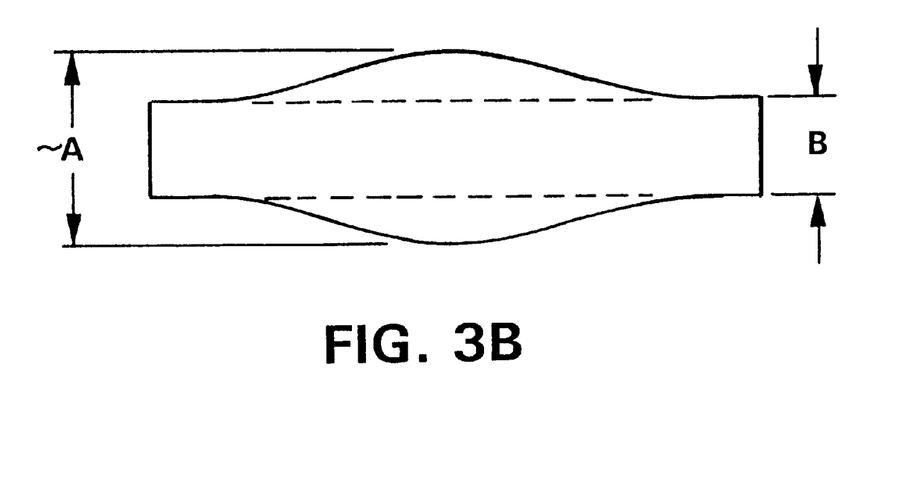
FIG. 3B is a plan view of a composite elastic necked-bonded material while partially stretched.

For example, with reference to FIGS. 3, 3A, and 3B, if it is desired to prepare a composite elastic necked-bonded material stretchable to a 150% elongation, a width of neckable material shown schematically and not necessarily to scale in FIG. 3 having a width "A" such as, for example, 250 cm, is tensioned by force F so that it necks down to a width "B" of about 100 cm. The necked material shown in FIG. 3A may have an elastic precursor (not shown) applied thereto and then treated to form an elastic layer (not shown). The resulting composite elastic necked-bonded material shown schematically and not necessarily to scale in FIG. 3B has a width "B" of about 100 cm and is stretchable to at least the original 250 cm width "A" of the neckable material for an elongation of about 150% (or as discussed herein, the material is stretchable to 250% of its relaxed unbiased width). As can be seen from the example, the elastic limit of the elastic sheet needs only to be as great as the maximum desired stretch of the necked-bonded laminate, often it will be desirable to employ an elastic layer having the ability to stretch to at least the pre-necked dimensions of the necked-bonded material.

Referring to FIG. 1, the necked material 28 is maintained in such tensioned, necked condition while the overlying elastomeric precursor 26 is treated, thereby forming an elastic layer 27 in intimate contact with the necked material 28 and which together form a composite elastic necked-bonded laminate 32. In this regard, it is important to note that due to the nature of the elastomeric precursor 26 and the porous neckable material, treatment of the elastomeric precursor 26 forms an elastic material which attaches to the necked material by bonding to the material and/or mechanically attaching thereto by physically forming about fibers at or near the surface of the necked material. Thus, in most instances, additional bonding or laminating processing will not be required to achieve a necked-bonded laminate having the desired integrity.

Treatment of the elastomeric precursor 26 will vary with regard to the particular precursor and the mechanism responsible for generating an elastic layer 27. For example, reactions may be induced by various means such as infrared radiation, ultrasound, ultraviolet radiation, x-ray, electron beam, etc. Elastomeric precursors employing these and other initiators to form an elastic are believed suitable for use with the present invention. Nevertheless, the most common commercially available elastomeric precursors typically include thermoset and latex formulations that are activated by heating or dried by heating or microwaves. Thus, although the particular embodiments discussed herein are directed toward use of heat set and/or latex formulations, the invention is not limited to use of such materials or processes employing the same.

In reference to the particular embodiment of FIG. 1, an elastomeric precursor 26, such as a latex or heat set formulation, may be treated by heating the necked material 28 and applied elastomeric precursor 26 in treating apparatus 30, such as an oven. In instances in which the treatment of the elastomeric precursor includes heating, it will be noted that this may be performed simultaneously with heating the necked material to create a "reversibly necked material" as described in U.S. Pat. No. 4,965,122 to Morman, the entire contents of which are incorporated herein by reference. In addition, the oven may have multiple temperature control zones (not shown) so that the necking process is substantially complete before significant treatment of the elastomeric precursor.

Additional bonding between the necked material 28 and a thermoplastic elastomeric layer may, optionally, be achieved by applying additional heat and/or pressure to the elastic necked-bonded laminate. Typically this will include bringing the elastic layer sufficiently above its $T_g$ to soften the elastic material to a point at which it is no longer elastic. The bonder-roll assembly 36 may be a patterned calender roll 38 arranged with a smooth anvil roll 40. Alternatively, a smooth calender roll may be used. For thermoplastic elastomers it may be further desirable to have one or both of the calender roll 38 and the anvil roll 40 heated and the pressure between these two rolls adjusted by well known means to provide the desired temperature and bonding pressure. Various other bond patterns may be used including, but not limited to, sinusoidal dot patterns and those patterns referred to herein above in connection with thermal point bonding. The bond surface area on the composite elastic necked bonded material 32 may approach about 100 percent and still provide a material with good stretch properties. Other methods may be used to further join the layers such as, for example, adhesives, ultrasonic welding, laser beams, and/or high energy electron beams.

The elastic layer 27 bonds to the necked material 28 and, thus, provides a composite elastic necked-bonded material 32 with excellent integrity and stretch properties. Due to the manner of bonding between the elastomeric layer 27 and necked material 28 it is possible to omit the step of providing additional bonding such as that provided by the bonder-roll assembly 36. In this regard, tensioning of the neckable material could be achieved by varying the speed of a variety of alternative drive roll assemblies. It will be further appreciated that with many elastic layers, such as those comprising thermoset elastomers, use of a protective layer over the elastic material may be omitted since, once treated, most thermoset materials no longer have the propensity to bond with adjacent materials even when experiencing heat and/or pressure while wound on a winder-roll.

Conventional drive means and other conventional devices which may be utilized in conjunction with the apparatus of FIG. 1 are well known and, for purposes of clarity, have not been illustrated in the schematic view of FIG. 1. In addition, it will be appreciated by those skilled in the art that the particular process could be varied in numerous respects without departing from the spirit and scope of the invention. For example, the neckable material may be pre-necked and treated to remain in its necked condition (e.g. reversibly necked) prior to being wound on the supply roll 14. As a further example, after treatment of the elastomeric precursor and formation of the elastic layer, a second necked material or second elastic sheet could be attached to the elastic layer. It will be further appreciated that the method of the present invention may be used in connection with others known in the art to fabricate a material which is stretchable in both the cross-machine and machine direction, see U.S. Pat. No. 5,116,662 issued to Morman, the entire contents of which are incorporated herein by reference. For example, the peripheral linear speed of a supply roll for the second elastic sheet could be adjusted to be lower than that of bonder-roll assembly 36 thereby stretching the second elastic layer. This will give the resulting laminate stretch in both the MD and CD directions.

In addition, those skilled in the art will appreciate that other methods of tensioning the neckable material may be used such as, for example, tenter frames or other cross-machine direction stretcher arrangements that elongate the neckable material so that, after bonding the elastomeric material to the necked material, the resulting composite elastic necked-bonded material will be elastic in a direction generally perpendicular to the direction of necking. The nonelastic material may also be gathered prior to necking. In such instances, the tensioning force may not narrow the fabric with respect to the gathered dimensions, however the fabric will be narrower than the fabric's original pre-gathered dimensions. "Necking" is intended to cover such tensioning and narrowing relative to the pre-gathered dimensions.

The neckable material 12 may be a knit, loosely woven or nonwoven material such as, for example, spunbonded web, meltblown web, coformed webs or bonded carded webs. If the neckable material is a nonwoven web, it desirably comprises microfibers. The neckable material may be any porous material that can be necked. The neckable material 12 may be made of fiber forming polymers such as, for example, polyesters, polyamides and polyolefins. Exemplary polyolefins include one or more of polypropylene, polyethylene, ethylene copolymers, propylene copolymers, and butene copolymers. Useful polypropylenes include, for example, polypropylene available from the Exxon Chemical Company under the trade designation Exxon 3445, and polypropylene available from the Shell Chemical Company under the trade designation DX 5A09. Polyamides which may be used in the practice of this invention may be any polyamide known to those skilled in the art including copolymers and mixtures thereof. Particularly commercially useful polyamides are nylon-6, nylon 6,6, nylon-11 and nylon-12 These polyamides are available from a number of sources such as Emser Industries of Sumter, South Carolina (Grilon® & Grilamid® nylons) and Atochem Inc. Polymers Division, of Glen Rock, N.J. (Rilsan® nylons), among others.

In one embodiment of the present invention, the neckable material 12 may itself comprise a multilayer laminate having, for example, at least one layer of spunbonded web joined to at least one layer of meltblown web, bonded carded web or other suitable material. For example, neckable material 12 may be a multilayer material having a first layer of spunbonded polypropylene having a basis weight from about 3.5 to about 270 g/m$^2$, a layer of meltblown polypropylene having a basis weight from about 3.5 to about 135 g/m$^2$, and a second layer of spunbonded polypropylene having a basis weight of about 3.5 to about 270 g/m$^2$. Alternatively, the neckable material 12 may be single layer of material such as, for example, a spunbonded web having a basis weight of from about 3.5 to about 340 g/m$^2$ or a meltblown web having a basis weight of from about 3.5 to about 270 g/m$^2$.

The neckable material 12 may also be a composite material made of a mixture of two or more different fibers or a mixture of fibers and particulates. Such mixtures may be formed by adding fibers and/or particulates to the gas stream in which meltblown or spunbond fibers are carried so that an intimate entangled commingling of meltblown or spunbond fibers occurs prior to collection of the fibers upon a collecting device to form a coherent web of randomly dispersed fibers and other materials. Examples of such materials include, but are not limited to, wood pulp, staple fibers and particulates such as, for example, hydrocolloid (hydrogel) particulates commonly referred to as superabsorbent materials.

If the neckable material 12 is a nonwoven web of fibers, the fibers should form a coherent web structure which is able to withstand tensioning and the resulting necking. The coherent web structure may be produced by bonding or entanglement between individual fibers which is inherent in the meltblown process. For materials which do not inherently form a coherent web, processes such as, for example, hydraulic entangling, thermal point bonding or needlepunching may be used to impart the desired degree of integrity. Alternatively and/or additionally a bonding agent may be used to achieve the desired bonding.

The elastomeric precursor 26 may comprise any material which may be applied to the neckable material and subsequently treated to induce drying, polymerization, crosslinking or the like, to form an elastomeric sheet or layer. In this regard a great variety of elastomers are known in the art such as, for example, polyurethanes, silicone rubbers, poly (isobutylene-isoprene), poly(styrene-butadiene), poly (acrylonitrile-butadiene), polychloroprene, polyisoprene, polysulfides, poly(ethylene-propylene-diene), chlorosulfonated polyethylene, polysiloxanes, poly(fluorinated hydrocarbon), poly(acrylate-butadiene), poly(styrene-ethylene/butylene-styrene). In one aspect of the invention, the elastomeric precursor may comprise a thermoset material which, in accord with the historical meaning of the term, cross-links upon heating. However, elastomeric precursors may also include materials which fall under the broader understanding of thermoset materials such as those in which further polymerization, cross-linking or curing is induced by means other than heat, such as by UV irradiation, infrared irradiation, ultrasound as well as other methods known in the art.

Latex formulations, including those for thermoplastic elastomers, may also be used in the present invention. With latex formulations, a coherent elastic layer is not formed until such time as the emulsion is treated, which typically consists of driving off or evaporating the water. In addition, elastomeric precursors for forming open and closed cell elastic materials, an example being a latex foam rubber, may also be used in connection with the present invention. As an example, some polyurethanes give off $CO_2$ gas when they react which acts to form a closed cell foam elastomer.

Typically the elastomers will be compounded to reduce costs and improve processing and, therefore, the particular formulations will vary with regard to the manner of application and mechanism for drying, coalescing, polymerization, curing and/or crosslinking of the precursor. Formulations for calendering poly(styrene-butadiene) and polychloroprenes are known in the art and are discussed in the *Encyclopedia of Polymer Science and Engineering*, vol. 6, ppg. 636–638 (1986). In addition, numerous suitable elastomeric precursors are available commercially, examples including: DPX-546.00 which is produced by DEXCO (a joint venture between Dow Chemical and Exxon) which is a thermoplastic latex formulation comprised of styrene-isoprene-styrene block copolymers; acrylic latex HYSTRETCH V-29 available from the B.F. Goodrich Co.; silicone rubber LSR 590 which is a two part crosslinkable material available from Dow Corning; and Q-THANE QW24 which is a polyurethane emulsion made by K.J. Quinn & Co. of Seabrook, N.H.

Further, the elastomeric precursor 26 may be a latex having an elastomer made from block copolymers having the general formula A—B—A' where A and A' are each a thermoplastic polymer endblock which contains a styrenic moiety such as a poly (vinyl arene) and where B is an elastomeric polymer midblock such as a conjugated diene or a lower alkene polymer. The elastomeric precursor 26 may be formed from, for example, an elastomer of (polystyrenelpoly(ethylene-butylene)/polystyrene) block copolymers available from the Shell Chemical Company under the trademark KRATON.

The elastic layer 27 may itself be tacky or, alternatively, a compatible tackifying resin may be added to the elastomeric precursor formulation to provide additional bonding between the elastomeric layer and the necked material. In regard to the tackifying resins and tackified elastomeric compositions, note the resins and compositions as described in U.S. Pat. No. 4,789,699 issued to Keiffer et al., the disclosure of which is hereby incorporated by reference. Any tackifier resin can be used which is compatible with the elastomeric precursor, the neckable material and can withstand the processing conditions, e.g. temperature. If blending materials such as, for example, polyolefins or extending oils are used, the tackifier resin should also be compatible with those blending materials. REGALREZ and ARKON P series tackifiers are examples of hydrogenated hydrocarbon resins. ZONATAK 501 lite is an example of a terpene hydrocarbon. REGALREZ hydrocarbon resins are available from Hercules Incorporated. ARKON P series resins are available from Arakawa Chemical (U.S.A.) Incorporated. Of course, the present invention is not limited to use of the aforesaid tackifying resins, and other tackifying resins which are compatible with the other components of the composition and can withstand the processing conditions, can also be used.

However, when significant tackifier is used it will typically be necessary to include an additional sheet of material, such as a second neckable material (or necked material depending on the point of engagement) prior to winding the elastic necked-bonded laminate on a winder-roll in order to prevent the tacky elastic layer from adhering to the back of adjacent materials on the roll. Dusting of the elastic layer may also be used to prevent such unwanted attachment.

Figure 4:
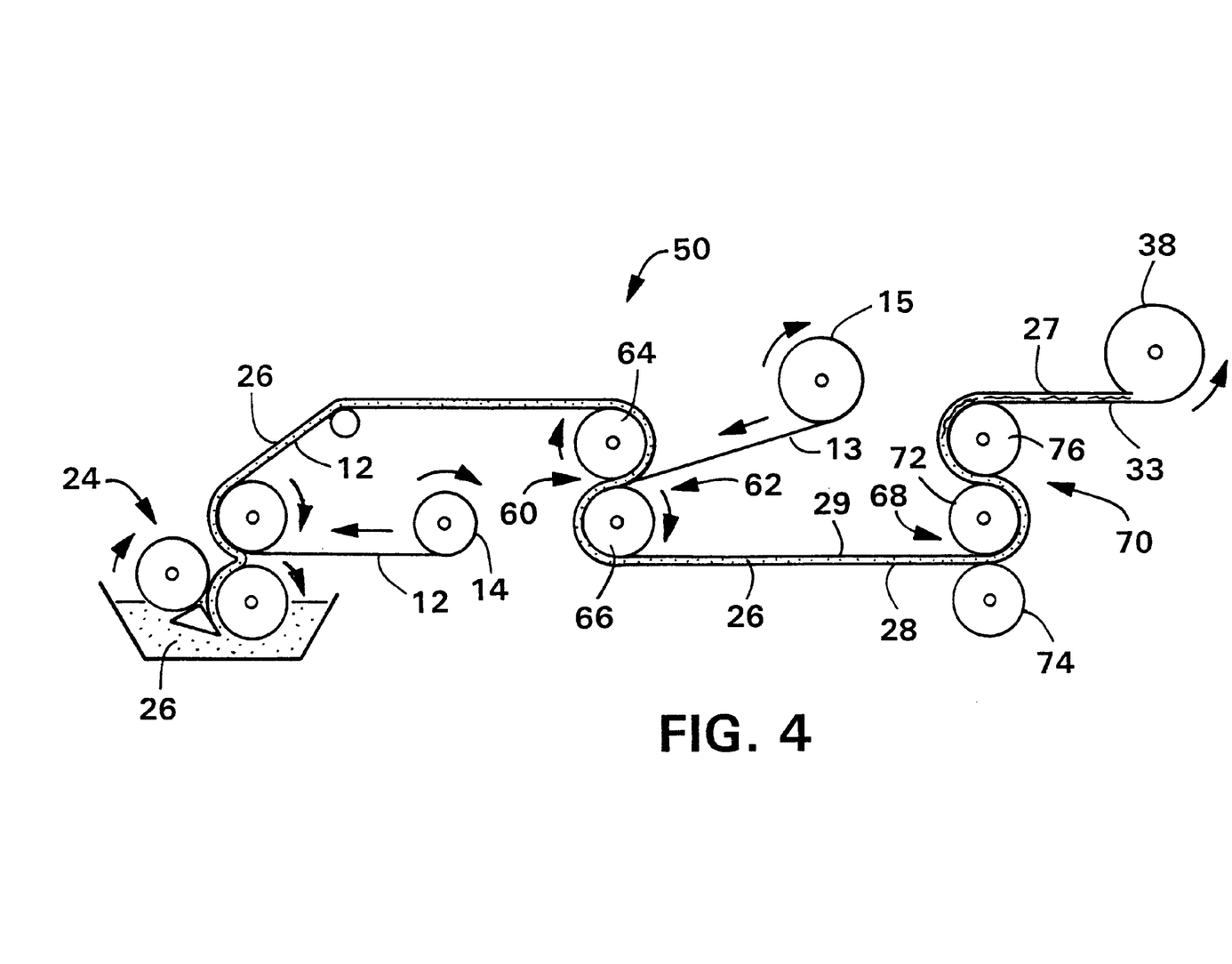
FIG. 4 is a schematic representation of an exemplary process for forming an elastic necked-bonded composite material having an elastic layer formed from an elastomeric precursor.

In a further aspect of the invention and in reference to FIG. 4, there is schematically illustrated at 50 an exemplary process for forming a composite elastic necked-bonded material by application of an elastomeric precursor 26 to a neckable material 12. A first neckable material 12 is unwound from a supply roll 14 and then travels in the direction indicated by the arrows associated therewith as the supply roll 14 rotates in the direction of the arrows associated therewith. An elastomeric precursor 26 is then applied to the first neckable material 12 by coating assembly 24, such as a reverse S-roll calender assembly. The neckable material 12 along with the elastomeric precursor 26 then pass through the nip 62 of an S-roll assembly 60 formed by the stacked rolls 64 and 66.

A second neckable material 13 is unwound from a second supply roll 15 and also passes through the nip 62 of the S-roll assembly 60 in a reverse-S wrap path as indicated by the direction of the arrows associated with the stack rolls 64 and 66. The second neckable material 13 passes through nip 62 in conjunction with the first neckable material 12 and elastomeric precursor 26 such that the elastomeric precursor 26 is positioned between the first and second neckable materials 12 and 13. Alternatively, the neckable materials 12 and 13 can be formed by nonwoven extrusion processes such as, for example, spunbonding or meltblowing processes and passed through the nip 62 and without first being stored on supply rolls 14 and 15. Because the peripheral linear speeds of the rolls of the S-roll assembly 60 is controlled to be lower than the peripheral linear speed of the rolls of the bonder-roll assembly 70, the neckable materials 12 and 13 are tensioned causing the material to neck forming necked materials 28 and 29.

The necked materials 28 and 29 and elastomeric precursor 26 may then be fed into bonder-roll assembly 70. The bonder-roll assembly 70 may be a smooth calender roll 72 and a smooth anvil roll 74 or may include a patterned calender roll, such as, for example, a pin embossing roll arranged with a smooth anvil roll. One or both of the calender roll 74 and the smooth anvil roll 76 are heated and the pressure between these two rolls may be adjusted by well known means to provide the desired temperature to treat the elastomeric precursor 26. Treating elastomeric precursor 26 forms elastic layer 27 which is directly bonded to the necked materials 28 and 29. The necked materials 28 and 29 bonded to elastomeric layer 27 collectively comprise a composite elastic necked-bonded material 33. As indicated above, the method of treating the elastomeric precursor will vary with regard to the particular elastomeric precursor employed in the process. One skilled in the art will also appreciate that some formulations may require longer treatment times than provided by heated calender rolls and in such instances other conventional in-line heating techniques may be employed such as by additional heated rolls, infrared heaters, microwave heaters, heating lamps, ovens and other heating means known in the art.

Conventional drive means and other conventional devices which may be utilized in conjunction with the apparatus of FIG. 4 are well known and, for purposes of clarity, have not been illustrated in the schematic view of FIG. 4. As indicated above, the nip pressure should be controlled or a gap maintained in order to control penetration of the elastomeric precursor within the neckable material unless barrier layers within the neckable material are employed as discussed herein above.

In addition, in a further aspect of the invention (not shown), elastomeric precursor may be applied to the second neckable material prior to superposing the respective neckable sheets. The second neckable material is juxtaposed with the first neckable material such that the elastomeric precursors applied to the respective neckable materials contact one another and are positioned between the two neckable materials. In such applications the desired amount of applied elastomeric precursor may be divided among the respective sheets. For example, if a 30 $g/m^2$ coating of elastomeric precursor is desired, 15 $g/m^2$ of precursor may be applied to each of the first and second neckable materials. It is believed that applying the elastic precursor to both neckable sheets will result in an elastic necked-bonded composite having improved integrity. In addition, the elastomeric precursor may be simultaneously applied to both the first and second neckable materials by spraying the elastomeric coating on to the neckable materials just prior to bringing the two materials together.

Figure 5:
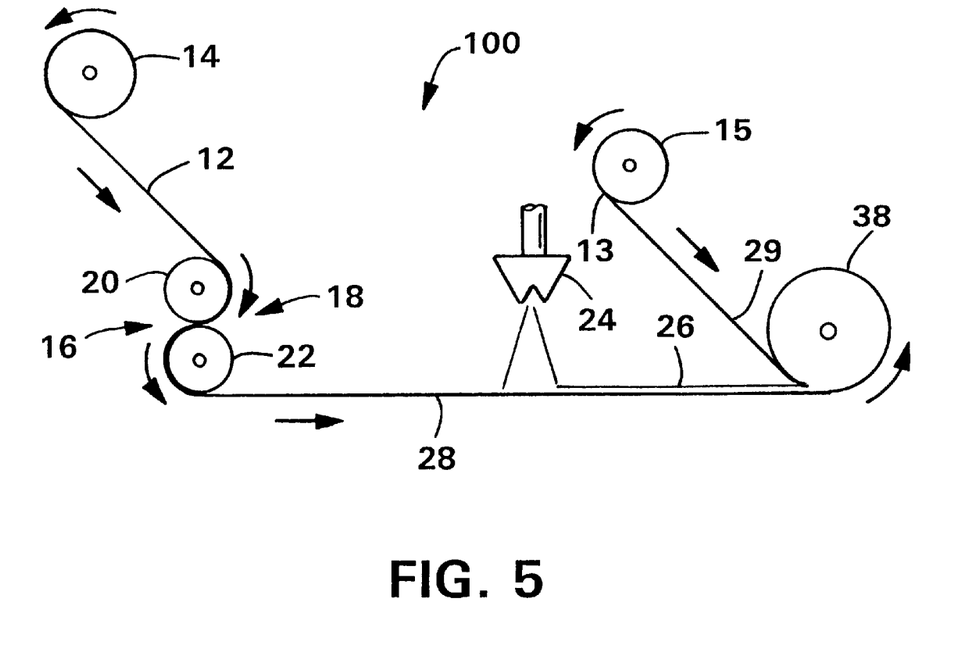
FIG. 5 is a schematic representation of an exemplary process for forming an elastic necked-bonded composite material having an elastic layer formed from an elastomeric precursor.

Referring now to FIG. 5 of the drawings, there is schematically illustrated at 100 an exemplary process for forming a composite elastic material by applying an elastomeric precursor 26 onto a first necked material 28. A first neckable material 12 is unwound from a supply roll 14. The neckable material 12 then travels in the direction indicated by the arrow associated therewith as the supply roll 14 rotates in the direction of the arrow associated therewith. The neckable material 12 may be formed by nonwoven extrusion processes, such as, for example, spunbonding or meltblowing processes, and then passed directly through the nip 18 of the S-roll assembly 16 without first being stored on a supply roll. The neckable material 12 then passes through the nip 18 of the S-roll assembly 16 in a reverse S path as indicated by the direction of the arrows associated with the stack rolls 20 and 22. Because the peripheral linear speed of the rolls of the S-roll assembly 16 is controlled to be lower than the peripheral linear speed of the wind-up roll 38, the neckable material 12 is tensioned so that it necks a desired amount before entering wind-up roll 38. Alternatively, additional roll assemblies and/or heaters can be added to the process if additional necking or multi-stage necking is desired. Desirably the necked material 28 is maintained in such tensioned, necked condition as the elastomeric precursor 26 is applied directly on the necked material 28.

As the necked material 28 passes under the coating assembly 24, such as spray coating equipment, a coating of an elastomeric precursor 26 is applied directly on the necked material 28. A stream of elastomeric precursor 26 is directed from bank of spray heads traversing the width of the necked material 28 and coats the necked material 28. The elastomeric precursor 28 may alternatively be applied by other known coating processes.

A second neckable material 13 is unwound from a supply roll 15. It is noted that for the purposes of the present invention the first and second neckable materials 12 and 13 need not be identical or even similar materials. The neckable material 13 then travels in the direction indicated by the arrow associated therewith as the supply roll 15 rotates in the direction of the arrow associated therewith. Because the peripheral linear speed of the supply roll 15 is controlled to be less than the peripheral linear speed of the wind-up roll 38, the neckable material 13 is tensioned so that it necks a desired amount forming necked material 29. The second necked material 29 is maintained in such tensioned, necked condition as it is juxtaposed with the elastomeric precursor 26 and the first necked material 28 such that the elastomeric precursor is positioned between the necked materials 28 and 29.

The two necked materials 28 and 29, with the elastomeric precursor 26 positioned there between, are guided into wind-up roll 38 forming a multi-layered composite. Thereafter, the rolled multi-layered material may be heated causing the elastomeric precursor to cross-link and/or cure into an elastomeric layer thereby producing a composite elastic necked bonded material which may be unwound from wind-up roll 38 when desired. It is noted that some elastomeric precursors will, given sufficient time, react at room temperature and thus with such formulations heating of the roll 38 could be omitted.

Conventional drive means and other conventional devices which may be utilized in conjunction with the apparatus of FIG. 5 are well known and, for purposes of clarity, have not been illustrated in the schematic view of FIG. 5. In particular, it will be appreciated that positioning the coating device immediately adjacent the roll assembly 16 will allow the elastomeric precursor 26 to be applied to the neckable material as it is being neck-stretched.

In a further aspect of the invention, an elastic necked-bonded composite is formed upon treating the elastomeric precursor 26 while in contact with both the first and second necked materials 28 and 29. In reference to FIG. 6, there is schematically illustrated at 150 an exemplary process for forming a composite elastic necked-bonded material 33 by application of an elastomeric precursor 26 to necked materials 28 and 29. A first necked material 28, an example being a reversibly necked material, is unwound from a first supply roll 14 and travels in the direction indicated by the arrows associated therewith as the supply roll 14 rotates in the direction of the arrows associated therewith. A second necked material 29 is simultaneously unwound from a second supply roll 15. Necked materials 28 and 29 pass through nip 154 of the roll assembly 152. However, prior to entering the nip 154 of the roll assembly 152 an elastomeric precursor 26 is simultaneously applied to the first and second necked materials 28 and 29 by coating assembly 24, such as a bank of spray heads. The coating assembly may be positioned in relation to nip 154 such that the elastomeric precursor 26 is applied to both necked materials 28 and 29. The necked materials 28 and 29 and elastomeric precursor 26 together, with the aid of guide roll 156, pass through the S-roll assembly 152 formed by the rolls 158 and 159.

Figure 6:
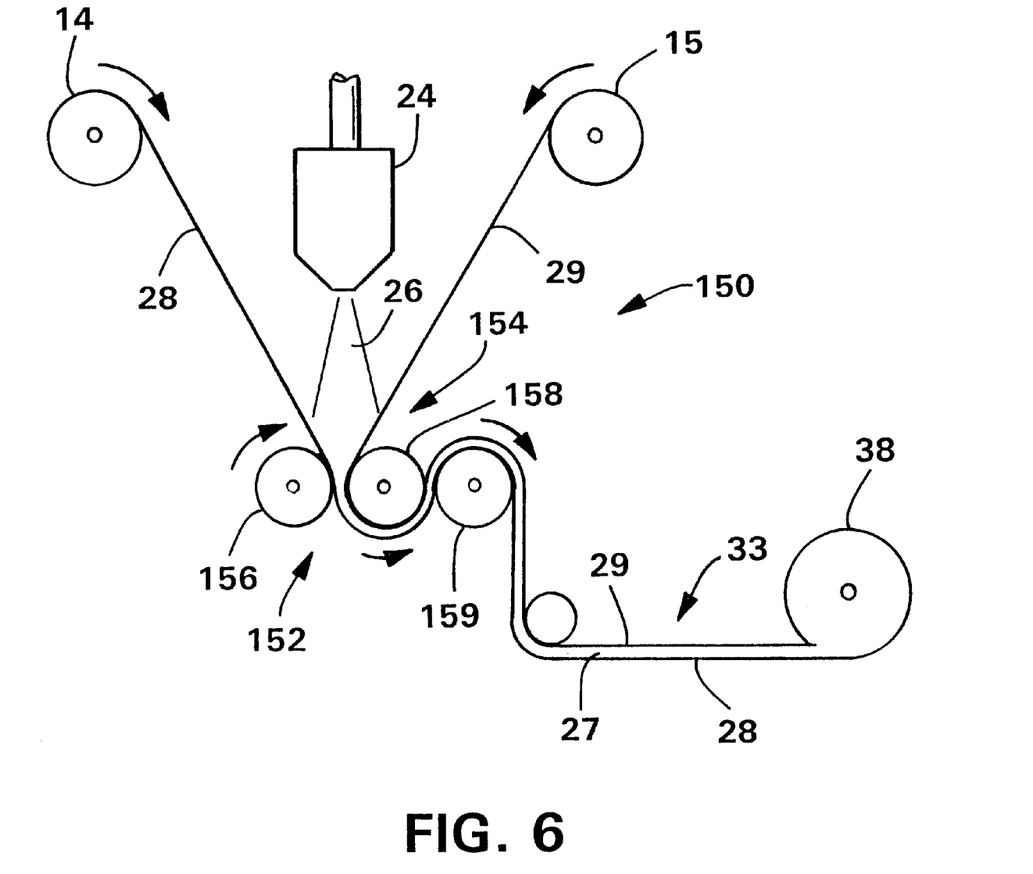
FIG. 6 is a schematic representation of an exemplary process for forming an elastic necked-bonded composite material having an elastic layer formed from an elastomeric precursor.

The S-roll assembly 152 may comprise a series of heated rolls 158 and 159 which treat the elastomeric precursor 26, e.g. dry or cross-link the elastomeric precursor 26. Treating elastomeric precursor 26 forms elastic layer 27 which is directly bonded to the necked materials 28 and 29, collectively the multiple layers comprise a composite elastic necked-bonded laminate 33. One skilled in the art will appreciate that some formulations may require longer treatment times than provided by heated calender rolls 158 and 159 and in such instances other conventional in-line heating techniques may be employed such as by additional heated rolls, infrared heaters, microwave heaters, heating lamps, ovens and other heating devices known in the art.

The spunbond material used in several of the examples set forth below was made using known methods and the resulting spunbond material had a basis weight of about 0.85 ounces per square yard (28.8 g/m$^2$) and a width of about 130 inches (330 cm). The spunbond material was then necked to a width of about 52 inches (132 cm). The necked spunbond relaxed to 56 inches (142 cm) upon aging on the roll and equivalently relaxed to 72 inches (183 cm) while being handled off the roll.

EXAMPLE 1

An acrylic latex, acquired from B.F. Goodrich V-29 HYSTRETCH®, was applied to the necked spunbond material with a #20 Meyer rod. The coated necked spunbond material was then placed in an oven at 103° C. for several minutes. The coated spunbond material was removed from the oven and recoated with the same elastomeric precursor with a #20 Meyer rod. The coated necked spunbond material was then placed in a 103° C. oven for 25 minutes. The resulting elastic necked composite had good attachment between the elastic layer and spunbond as well as excellent stretch and recovery properties.

EXAMPLE 2

A portion of un-necked 0.5 ounces per square yard (17 g/m) spunbond material was cut into a smaller section and attached to two doweling rods. Thereafter a silicone rubber elastomeric precursor, LSR 590 from Dow-Corning with the two components mixed in about a 50:50 blend, was applied with a #28 Meyer rod. The two doweling rods were pulled to neck the LSR-590 coated spunbond and the material was wound while necked. The coated spunbond was put in a 112° C. oven for 45 minutes to cross-link the LSR-590 resulting in an elastic necked-bonded laminate.

EXAMPLE 3

Figure 7:
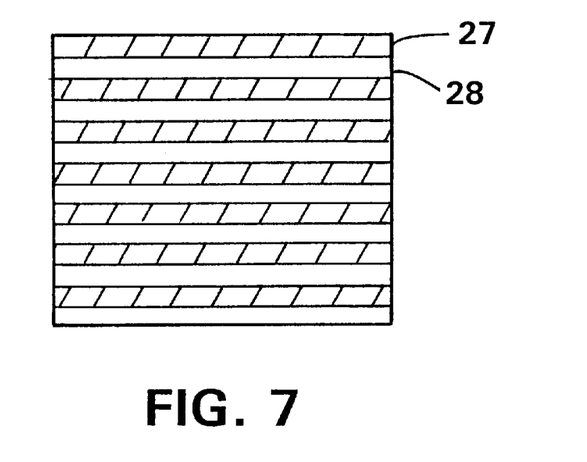
FIG. 7 is a top view of a composite elastic necked-bonded material having a discontinuous patterned elastic layer.

A section of 0.85 ounces per square yard (28.8 g/m$^2$) necked spunbond material was taped across its width, in the CD, with about 0.5 inch (1.27 cm) tape and 0.375 inch (0.95 cm) spacings. An elastomeric precursor, silicone rubber LSR-590 from Dow-Corning, was applied to the spunbond with a Meyer rod. The tape was then removed. The coated material was put in an oven for a sufficient time and temperature to cause the silicone rubber to cross-link forming an elastic layer. The resulting elastic necked-bonded composite is depicted in FIG. 7 and has columns of elastic material 27 over the necked material 28. The patterned elastomer provided sufficient stretch and recovery properties to the necked-bonded elastic composite such that when stretched in the CD the composite substantially returned to it original dimensions.

While the invention has been particularly shown and described in detail with respect to specific embodiments thereof, it will be understood by those skilled in the art that changes in form and details may be made to the invention without departing from the spirit and scope of the present invention.

What is claimed is:

1. A method of forming a stretchable composite comprising:
    applying an elastomeric precursor to a first neckable material; then
    neck-stretching said neckable material; and
    treating said elastomeric precursor to form an elastomeric layer wherein said elastomeric layer bonds to said necked material and wherein said neckable material recovers after being stretched in the necked direction.

2. A method according to claim 1 wherein said elastomeric precursor comprises a latex.

3. A method according to claim 2 wherein treating said elastomeric precursor comprises drying said latex.

4. A method according to claim 1 wherein said elastomeric layer comprises a thermoset polymer.

5. A method according to claim 4 wherein treating said elastomeric precursor comprises heating.

6. A method according to claim 5 further comprising the step of cooling said necked material in the necked condition wherein a reversibly necked material is formed from said neckable material.

7. A method according to claim 1 further comprising the step of superposing a second neckable material with said elastomeric precursor and said first neckable material wherein said elastomeric precursor is positioned between said first and second neckable materials.

8. A method according to claim 1 wherein an elastomeric precursor is applied to said second neckable material.

9. A method according to claim 1 wherein applying said elastomeric precursor comprises applying about 5 g/m$^2$ to about 100 g/m$^2$ of said elastomeric precursor to said neckable material.

10. A method according to claim 2 wherein applying said elastomeric precursor comprises applying from about 5 g/m$^2$ to about 50 g/m$^2$ of said elastomeric precursor to said neckable material.

11. A method of forming a stretchable composite comprising:
    applying an elastomeric precursor comprising a thermoset polymer to a first neckable material after neck-stretchinq said neckable material; and
    treating said elastomeric precursor to form an elastomeric layer wherein said elastomeric layer bonds to said necked material and wherein said neckable material recovers after being stretched in the necked direction.

12. A method according to claim 11 wherein treating said elastomeric precursor comprises heating.

13. A method according to claim 12 further comprising the step of cooling said necked material in the necked condition wherein a reversibly necked material is formed from said neckable material.

14. A method according to claim 11 further comprising the step of superposing a second neckable material with said elastomeric precursor and said first neckable material wherein said elastomeric precursor is positioned between said first and second neckable materials.

15. A method according to claim 14 wherein an elastomeric precursor is applied to said second neckable material.

16. A method according to claim 11 wherein applying said elastomeric precursor comprises applying from about about 5 g/m$^2$ to about 100 g/m$^2$ of said elastomeric precursor to said neckable material.

17. A method according to claim 12 wherein applying said elastomeric precursor comprises applying from about 5 g/m$^2$ to about 50 g/m$^2$ of said elastomeric precursor to said neckable material.

18. An elastic necked-bonded composite formed by the process of claim 1.

19. An elastic necked-bonded composite formed by the process of claim 7.

20. An elastic necked-bonded material formed by the process of claim 17.

* * * * *